(12) United States Patent
Forkner et al.

(10) Patent No.: US 7,287,229 B2
(45) Date of Patent: Oct. 23, 2007

(54) TEMPLATE-DRIVEN PROCESS SYSTEM

(75) Inventors: Damien R. Forkner, Corvallis, OR (US); Jeffrey M. Munsey, NE Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 10/115,395

(22) Filed: Apr. 3, 2002

(65) Prior Publication Data
US 2003/0189585 A1  Oct. 9, 2003

(51) Int. Cl.
*G06F 3/00* (2006.01)
*G06F 3/14* (2006.01)

(52) U.S. Cl. .............. 715/762; 715/733; 715/746; 715/760; 715/513

(58) Field of Classification Search .......... 345/733, 345/738, 744, 746, 760, 764, 765, 853, 854, 345/864, 866; 710/10; 715/503, 513, 733, 715/738, 744, 746, 760, 762, 764, 765, 853, 715/854, 864, 866, 700, 908
See application file for complete search history.

(56) References Cited

U.S. PATENT DOCUMENTS

| | | | | |
|---|---|---|---|---|
| 5,247,661 A | | 9/1993 | Hager et al. ............. 395/600 |
| 5,276,869 A | | 1/1994 | Forrest et al. ............. 395/600 |
| 5,317,683 A | | 5/1994 | Hager et al. ............. 395/145 |
| 5,377,355 A | | 12/1994 | Hager et al. ............. 395/650 |
| 6,112,242 A | * | 8/2000 | Jois et al. ............... 709/225 |
| 6,263,352 B1 | * | 7/2001 | Cohen .................... 715/513 |
| 6,477,565 B1 | * | 11/2002 | Daswani et al. ........... 709/217 |
| 6,546,397 B1 | * | 4/2003 | Rempell ................. 707/102 |
| 6,665,090 B1 | * | 12/2003 | Hall et al. ............... 358/1.18 |
| 6,691,281 B1 | * | 2/2004 | Sorge et al. .............. 715/503 |
| 6,697,825 B1 | * | 2/2004 | Underwood et al. ....... 715/530 |
| 6,826,727 B1 | * | 11/2004 | Mohr et al. .............. 715/517 |
| 6,941,515 B1 | * | 9/2005 | Wilkins ................... 715/719 |
| 2001/0052910 A1 | * | 12/2001 | Parekh et al. ............ 345/744 |
| 2002/0080177 A1 | * | 6/2002 | Orbanes et al. | |
| 2002/0100014 A1 | * | 7/2002 | Iborra et al. ............. 717/104 |
| 2002/0105546 A1 | * | 8/2002 | Kuntz .................... 345/762 |
| 2002/0122060 A1 | * | 9/2002 | Markel ................... 345/760 |
| 2002/0194219 A1 | * | 12/2002 | Bradley et al. | |
| 2002/0199187 A1 | * | 12/2002 | Gissin et al. ............. 725/32 |
| 2003/0004993 A1 | * | 1/2003 | Templeton et al. ........ 707/513 |
| 2003/0011630 A1 | * | 1/2003 | Knowlton et al. ......... 345/731 |
| 2003/0025732 A1 | * | 2/2003 | Prichard ................. 345/765 |
| 2003/0149934 A1 | * | 8/2003 | Worden | |
| 2003/0172344 A1 | * | 9/2003 | Dencker et al. ........... 715/500 |

(Continued)

OTHER PUBLICATIONS

Douglas Cobb, "The trouble with templates", Jun. 1985, Business Software, vol. 3, No. 6, p. 22-5.*
U.S. Appl. No. 60/284,746, filed Apr. 18, 2001.*
U.S. Appl. No. 60/335,791, filed Dec. 5, 2001.*
Susan Glinert, "Bravo 2.0" May 1994, Windows Sources, v2, n5, p160(1).*

(Continued)

*Primary Examiner*—X. L. Bautista

(57) ABSTRACT

A template-driven process system includes a template that contains information about an interactive web program that utilizes a plurality of web pages to create a document. The information defines for each web page in the plurality of web pages characteristics about fields for receiving data from an end user. The information also defines for the document a plurality of document states. Each document state in the plurality of document states identifies at least one end user allowed to access the document and at least one action that can be performed on the document. Different document states identify different end users and different actions.

26 Claims, 5 Drawing Sheets

U.S. PATENT DOCUMENTS

2004/0070613 A1* 4/2004 Sprague et al. ............. 345/762
2005/0022115 A1* 1/2005 Baumgartner et al. ...... 715/513

OTHER PUBLICATIONS

"BESTWARE: BestWare INTRODUCES M.Y.O.B. 7.5", Jun. 1998, M2 Presswire.*

'ERoom Upgrades Virtual Workplace' from PCWORLD.com, printed from the web url: http://www.pcworld.com/resource/printable/article/O,aid,85083,00.asp on Apr. 26, 2002 1 page.

'Intruducing V6.0 your digital workplace' from eWeek, printed from the web url: http://eroom.com/default_netnew.asp on Apr. 26, 2002 1 page.

'ERoom Learns How to Share in REal Time' from PCWORLD. COM, print d from the web url: http://pcworld.com/resource/printable/article/O,aid,50644,OO.asp on Apr. 26, 2002 1 page.

'The Web Makes Room for ERoom' from PCWORLD.COM, printed from the web url: http://www.pcworld.com/resource/printable/article/0,aid, 16204,00.asp on Apr. 26, 2002 2 pages.

* cited by examiner

INVENTION DISCLOSURE SYSTEM

ADDRESS: http://

- Documentation
- Form Preview
- ✓ General Information
- ✗ Description of Invention
- ▽ Invention History
  - ✓ Published
  - ✗ Announced
  - ✗ Disclosed
  - ✗ Urgency
  - ✗ Described
  - ✗ Built
  - ✗ Government Contract Edit Disclosure: Test Technology 36 % Complete < Previous | Next >

Save and Close

Announced (*Required*)
Was a product including the invention announced, offered for sale, sold, or is such activity proposed? If so, when and where?

Yes ▽

Date Announced (*Required if Announced is Yes*)
When was this invention announced, offered for sale, or sold?

April ▽ 02 ▽ 2001 ▽

Announced Details (*Required if Announced is Yes*)
Describe the details of the announcement of this invention.

Product Described in IEEE Journal Article.

TEMPLATE-DRIVEN PROCESS SYSTEM

BACKGROUND OF THE INVENTION

The present invention pertains to processes for preparing documents and pertains particularly to a template-driven process system.

The Internet started as a cooperative research effort of the United States Federal Government known as the Advanced Research Project Agency Network (ARPAnet). The ARPAnet tied universities and research and development organizations to the U.S. military establishment. More recently, the Internet has extended its use commercially and internationally. It is the world's largest computer network.

A Uniform Resource Locator (URL) address is an Internet address. A URL address consists of a string expression that designates a resource (referred to herein as a URL page) on the Internet. For example the resource is a particular file on a computer connected to the Internet.

Web browsers such as Netscape Navigator browser available from Netscape, and Internet Explorer browser available from Microsoft Corporation use URL addresses to access resources (URL pages) on the Internet. The World Wide Web (Web) allows users to navigate Internet resources intuitively, without using internet protocol (IP) addresses or other special technical knowledge. The Web is made up of interconnected web pages, or web documents stored on web servers. These pages are accessed with the use of a web browser.

The Web uses a transfer method known as Hypertext Transfer Protocol (HTTP). One format for information transfer is to create documents using Hypertext Markup Language (HTML). HTML pages are made up of standard text as well as formatting codes that indicate how the page should be displayed. A web browser reads these codes in order to display the page.

Each Web page may contain graphics, video and audio information in addition to text. Hidden behind certain text, pictures or sounds are connections, known as hypertext links (links), to other pages within the same web server or on other computers within the Internet. Each link is directed to a web page by a Uniform Resource Locator (URL). A user may also specify a known URL by writing it directly into the command line of a web browser.

The Web is a request-based environment. A user makes a request in the form of an HTTP request that is routed to the appropriate web server, which responds with the appropriate HTML content.

Automating complex processes on the World Wide Web is often accomplished by building a one-time collection of scripts that produce the HTML forms necessary to solve a specific problem. For example, a process can be automated by writing a custom software solution, often in Perl or in Java, designed to solve the specific problem at hand. Such custom software solutions are difficult to maintain, difficult to upgrade, and difficult to integrate with other knowledge management solutions. Rapidly changing processes are difficult to keep up with if the software is not sufficiently flexible to allow for change, and is nearly impossible if the original programmer leaves. A complete code rewrite is often necessary to solve different but related problems.

Alternatively, a proprietary environment, such as Lotus Notes, can be chosen to automate a complex paper process. Typically, this is done by hiring and/or training people to write custom database applications in the proprietary environment. One disadvantage of using such a proprietary environment is that a proprietary client must be installed and maintained by users. Another major disadvantage is the continual upgrading that must occur to match vendor upgrades, often requiring software to be rewritten with major upgrades. Reliance on an outside vendor makes generating custom solutions difficult, and if the proprietary environment changes or disappears, this can make the custom solution obsolete.

SUMMARY OF THE INVENTION

In accordance with the preferred embodiment of the present invention, a template-driven process system includes a template, a template translator, and an interactive application. The template translator translates the template into the interactive application.

BRIEF DESCRIPTION OF THE DRAWINGS

FIG. 4 shows a sample web page utilized by the template-driven process system in accordance with a preferred embodiment of the present invention.

DETAILED DESCRIPTION OF THE PREFERRED EMBODIMENT

In the preferred embodiment of the present invention a template for a process is prepared to receive all information relative to the process. For example, the information can include document states, fields, database views, and formatting options. A single software system then handles any number of templates using the same code. Adding features, changing fields in the database, or changing the flow of the process merely involves modifying the template, not changing the code.

An easy-to-generate template that can be built, maintained, and upgraded by those who are responsible for the process that the template implements. Preferably, Perl or XML are used for these tasks, although other programming languages could be used. The software that translates the template into an interactive web application can be changed and upgraded with no effect on the templates, allowing for smooth upgrades, bug fixes, and new feature additions. Templates are designed online and the design application places code for templates in files. A graphic user interface (GUI) is used to display a graphic version of template that is generated from the code for the template.

Building one system that interprets many templates can automate many paper processes at once in a general way, rather than generating custom solutions for each paper process. Only one piece of software needs to be maintained and upgraded, and all solutions share a common data storage architecture. What is meant by a paper process (also called a document process) is any process that involves documents that could be printed. Thus a paper process includes a document stored in electronic form (whether or not the document is ever actually printed).

The preferred embodiment uses a World Wide Web (WWW) interface that allows the system to be operating system-independent. No proprietary client software is necessary besides a web browser. Other embodiments utilize other types of interfaces such as proprietary interfaces designed for a particular implementation.

Templates can be rapidly developed and maintained by non-programmers. In this way, one programmer can support many automated processes with no significant increase in workload.

Changes to applications that have been automated using a template are simple. The normally complex tasks of adding a field, changing documentation, building database views, and even modifying the basic states that each document goes through are reduced to simply editing the application template. These tasks are normally complex and involve programming.

Adding new functionality to the system can be simply achieved without breaking any other application templates. Application templates are also referred to as applications. The programmer can simply add functionality necessary to implement a new feature that is called for in a given template, and then all application templates can take advantage of the new feature.

Figure 1:
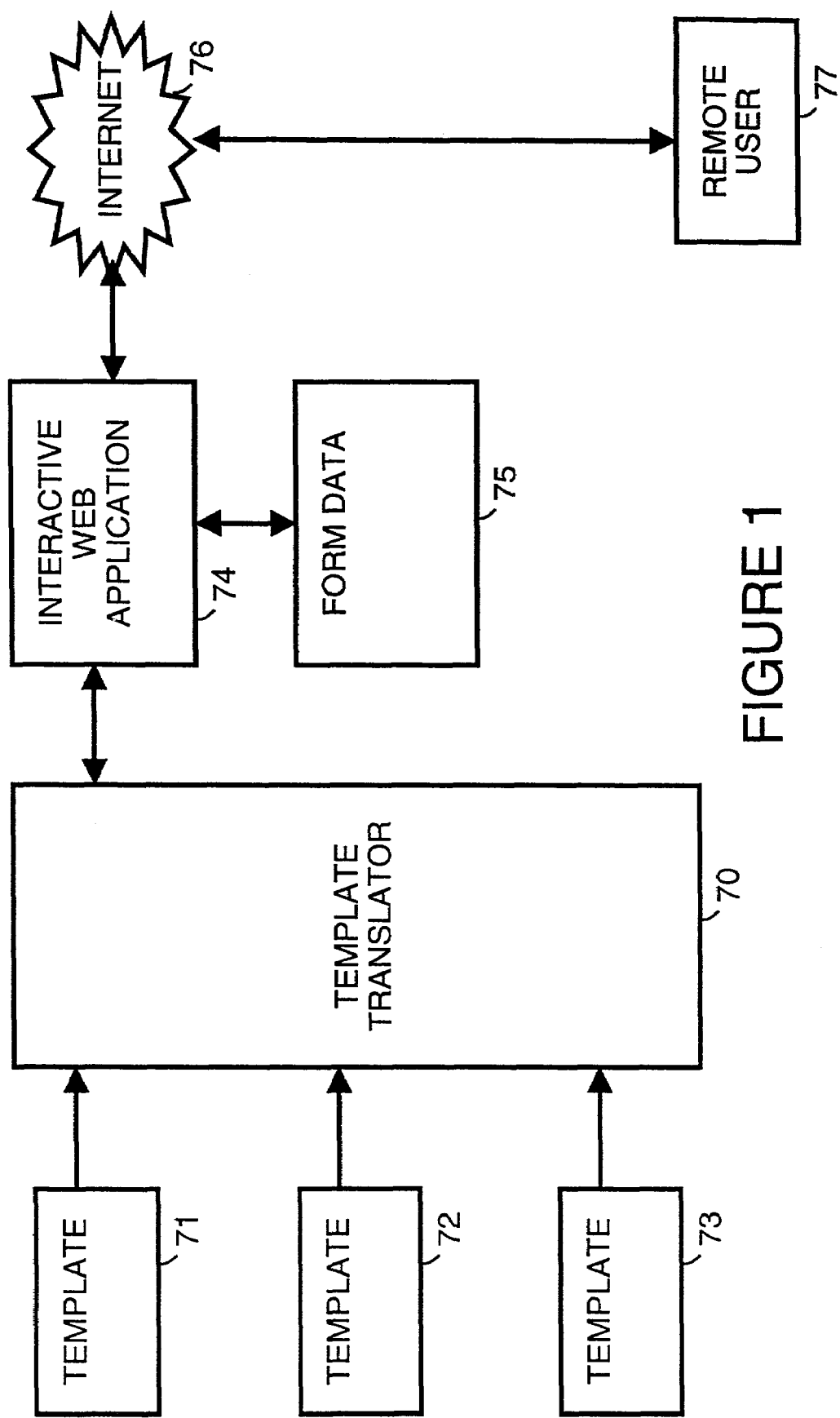
FIG. 1 is a simplified block diagram of a template-driven process system in accordance with a preferred embodiment of the present invention.

For example, FIG. 1 shows a template translator 70 used to translate any of a template 71, a template 72 or a template 73 to an interactive web application 24. A remote user 77 can access the interactive web application 74 through the internet 76. Form data 75 from the user is stored by interactive web application 74. What is meant by an interactive application is an application that is capable of interacting with a user. For example, remote user 77 can use any computing system such as a desktop computing system, a portable computer, a personal digital assistant (PDA), a pager with onboard processing capability, a telephone with onboard processing capability, and so on to access the interactive application. While a preferred embodiment utilizes a web interactive application, any other type of interactive application capable of being accessed by a user can be used. In a preferred embodiment of the present invention, template translator 70 customizes the interactive application to optimally interface to the device used by the user to interface with the interactive application. For example, for a device with limited display capability, such as a PDA or pager, template translator 70 will significantly reduce the graphics in the interface to take into account the reduced display capability. Details of the operation of template translator 70 in one embodiment will be discussed later in conjunction with the flowchart of FIG. 5.

Templates allow a unique capability to build an application interactively, in real-time. The process of building an application to automate a paper process is as simple and fast. For maximum effect, the template can be generated with a user's involvement in real time. The resulting web application is then available.

Templates are a collection of all information, characteristics, and documentation associated with a particular process that is to be automated. Herein, the invention is illustrated using a template that automates a business process, particularly, the preparation and submission of invention disclosures. Information specific to invention disclosures is contained in the template. While the invention is illustrated using an automation process, the principles of the invention are equally useful in all sorts of processes. For example, templates can be used in a database that stores anything from recipes to corporate records. The templates can also be used for preparing many types of business forms or any other type of documents that can utilize templates. Templates can also be used for processes that perform record keeping, such as tracking score or other statistics at a sporting event.

When implementing a template using the World Wide Web, an Application (i.e., an application template) is a tree of linked Pages with a specific Home Page. An Application inherits formatting and basic properties from a System. A Page is a collection of elements of Content. An element of Content has a ContentType and may be a link to another Page or a group of Views. A View has a ViewType and is a collection of Documents specified by a set of filters, such as a browse page or a report.

Figure 2:
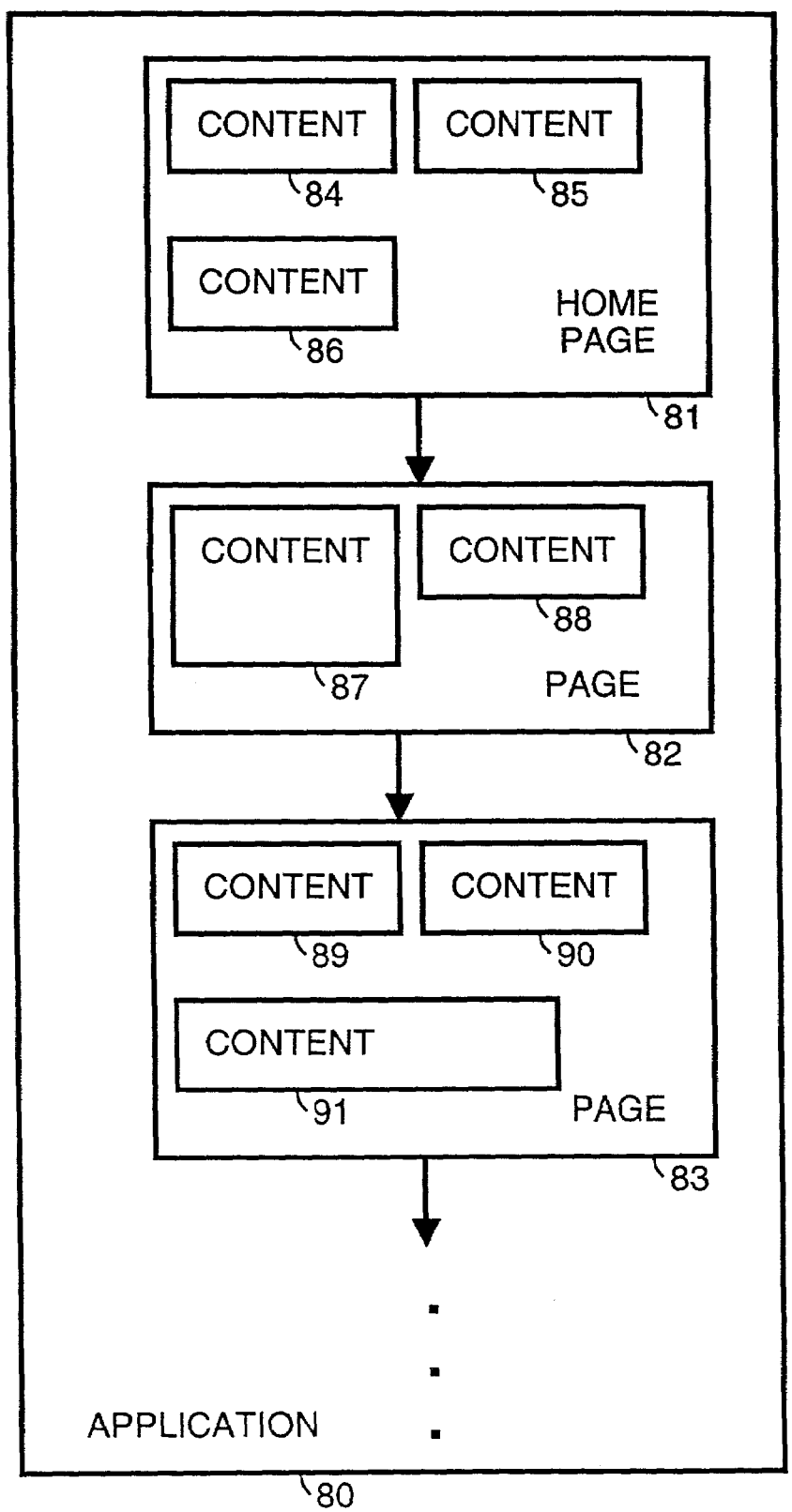
FIG. 2 is a simplified block diagram of an application within a template-driven process system in accordance with a preferred embodiment of the present invention.

For example, FIG. 2 shows an application 80 having a home page 81, a page 82 and a page 83. The application includes additional pages (not shown). Home page 81 includes content element 84, content element 85 and content element 86. Page 82 includes content element 87 and content element 88. Page 83 includes content element 89, content element 90 and content element 91.

A Document is an object in the database. A Document has some required MetaFields that the system maintains. A Document has one or more States, and can only exist in one State at a time. A State has one or more Contexts for users with different roles. A Context points to a set of available Actions.

An Action has an ActionType and is something that happens to a single Document, such as Edit, View, State Transition, or Notification. Some Actions have ActionPages that define more than one screen of things to do. An ActionPage has an ActionPageType. Actions and ActionPages link to other Actions. Actions and ActionPages edit or view a set of Fields, depending on the ActionType. A Field has a FieldType and corresponds to a field in the database. Each Field defines text for available DocumentationFields.

In the preferred embodiment, an Application is a set of pages and is the primary entry point for a given database application. An application inherits values from system templates.

An application template defines a name and description for a given application, text to be used on the navigation bar, a home page that acts as the root of the tree of pages for this application, override values for anything defined in the system templates, and an access list and a no_access list may be defined. The application template inherits all values from the system templates.

FIG. 2 illustrates that there can be a number of different classes of templates, as defined by a user. For example, in FIG. 2 there is shown an application class template (application 80), page class templates (pages 81-83) and content class templates (content 84-91). In FIG. 2 the pages are in a linked page structure. However, templates can be within any type of linked or unlinked hierarchy or other arrangement. For example a common structure is a tree structure with each template being a node within the tree structure.

As illustrated by FIG. 2, one layer of template can include sublayers of templates. For example, content templates 87 and 88 are shown to be part of a higher level page template 82. Page templates 82 and 83 are shown to be part of a higher level application template 82. Content templates 87 and 88 may thus be referred to as subtemplates within page template 82. Page templates 82 and 83 and content templates 87 and 88 may be referred to as subtemplates within application template 80.

Table 1 below give an example of an application layer template.

TABLE 1

```
%TEMPLATE = (
    class            => 'application',
    name             => 'Disclose',
    alias            => 'disclose',
    description      => "Invention Disclosure System",
    nav_bar_title    => "disclose",
    nav_bar_loading  => "wait",
    header_bar_loading => "Loading page. Please wait...",
    page_title       => "Invention Disclosure System",
    home_page        => "disclose_home",
);
```

In Table 1 above, home_page points to a single page where each page may contain links to other pages.

A Page is a set of content elements organized and presented as a single HTML page. A page may include links to other pages, links to views, or other types of content not yet defined. A page template contains a name and description for a given page that become the title and subtitle, a list of content elements to be placed on the page. Also an access list and a no_access list may be defined within a page template.

Table 2 below give an example of a page template.

TABLE 2

```
%TEMPLATE = (
    class       => 'page',
    name        => 'My Invention Disclosures',
    alias       => 'disclose_home',
    description => "Version 2.22",
    content => [
        super_user_views,
        corvallis_review_committee_views,
        san_diego_review_committee_views,
        patent_clerk_views,
        legal_admin_views,
        patent_coordinator_views,
        start_new_views,
        reviewer_views,
        main_views,
        special_access_views,
    ],
);
```

In Table 2 above, each item in the content list refers to another template of type content.

Content is an element of a page (probably rectangular in shape). For example, Content is a collection of views or links to other pages. The type of the content is defined by a ContentType template.

A content template defines some piece of a page. Two basic types of content are a group of views or a link to another page. The type of the content will determine how the engine displays it. Content templates contain a name and description for a given content element, a type, such as view_group, an availability. The availability is either not_empty or always (default). If the availability is not_empty, the content element will only be displayed if any view contained in the content element should be displayed. An access list and no_access list may also be defined within a content template.

Table 3 below give an example of a content template.

TABLE 3

```
%TEMPLATE = (
    class       => 'content',
```

TABLE 3-continued

```
    name        => "Corvallis Review Committee Views",
    alias       => 'corvallis_review_committee_views',
    description => "Views for the Corvallis Site Review Committee",
    availability => "not_empty",
    type        => "view_group",
    access => [
        "GROUP|corvallis_site_review_committee",
        "GROUP|patent_coordinators",
        "GROUP|super_users",
    ],
    views => [
        'corvallis_site_review_committee_awaiting_reviewer_assignment',
        'corvallis_site_review_committee',
        'corvallis_site_review_committee_awaiting_feedback',
    ],
);
```

In Table 3 above, each item in the views list refers to another template of type view. Also, entities in the access list designated by GROUP are database objects of class access_group.

A View is a collection of zero or more documents (not necessarily of the same class) defined by a set of rules. For example, a view can be a browse view defined by a set of filters or a report. A View must be of a type defined by a ViewType template.

Each view template contains a name and description for the view, a type, such as browse or report, an availability, an icon, and everything necessary to define the view. The availability is either not_empty or always (default). If the availability is not_empty, the view will only be displayed if it contains more than zero documents. An access list and no_access list may be defined within a view template.

As a special case, a view can be of type create_new which creates a new document in the database. If so, the template must define a document template to create a document from, a state template as the initial state, and, if desired, an initial action that will immediately be called.

Table 4 below gives an example of a view template.

TABLE 4

```
%TEMPLATE = (
    class       => 'view',
    name        => "My Invention Disclosures in Progress",
    alias       => 'in_progress',
    description => "Edit, view, or see the history of your Invention Disclosures in progress",
    type        => "browse",
    availability => "not_empty",
    icon        => "document",
    fields => [
        "STATUS",
        "UPDATED",
        "ACTIONS",
        "invention_title",
        "inventors",
    ],
    sort_key => "invention_title",
    filters => [
        "AND|STATUS|in_progress",
        "OR|inventors|LOGGED_IN_USER",
        "|creator|LOGGED_IN_USER",
    ],
);
```

In Table 4 above, each item in the fields list refers to another template of type field or a special field such as STATUS, UPDATED, or ACTIONS. These map into columns in the browse view. The sort_key defines which field to initially sort the browse view by. The filters list defines what documents the browse view contains. This is given as a list in prefix notation. The filter list here maps out to: (documents in the state in_progress) AND ((documents in which the inventors field contains the currently logged in user) OR (documents in which the creator field contains the currently logged in user)).

A Document is a class of object in the database. Each document templates defines a list of states and a list of fields that make up the document.

A document template defines a class of object in the database. It contains a name and description of the class of objects, a list of states, a list of fields, and any field mapping information necessary to interpret documents of this class whose fields may have been renamed or changed.

Table 5 below give an example of a document template.

TABLE 5

```
%TEMPLATE = (
    class       => 'document',
    name        => 'Invention Disclosure',
    alias       => 'invention_disclosure',
    description => "Invention Disclosure Form",
    states => [
        'in_progress',
        'submitted',
        'awaiting_PD_number',
        'awaiting_reviewer_assignment',
        'awaiting_site_review',
        'file',
        'publish',
        'trade_secret',
        'hold',
        'inactivate',
        'forward',
    ],
    fields => [
        'invention_title',
        'abstract',
        'problem_solved',
        'advantages',
        'description',
        'inventors',
        'inventor_addresses',
        'inventor_citizenships',
    ],
);
```

In Table 5 above, the order of the fields and states is irrelevant.

The state of a given document defines a set of required fields and a list of contexts that are valid entry points for the document.

A state template defines a state of a document. The state is preferably stored as a MetaField with every document in the database. A given document can only be in one state at one time. Documents that require workflow and sequential actions by different groups of people (in different roles) have multiple states. Simple documents may only have one state, but at least one state must be defined for each document. Each state template preferably contains a name and description for each state, a background color and text color for use in the status logo for each document, a set of required fields that can be used to ensure completeness before certain actions become available, a set of text descriptions of documents in this state for which none of the requirements have been completed, some of the requirements have been completed, and all of the requirements have been completed, and a list of valid contexts with which a user may view this document. In this embodiment, order is significant if a user has access to more than one context. The requirements of the first context in this list that the user has access to will be the requirements used for that user.

Table 6 below give an example of a state template.

TABLE 6

```
%TEMPLATE = (
    class       => 'state',
    name        => "In Progress",
    description => "Disclosures that have not yet been submitted",
    bgcolor     => "#800000",
    textcolor   => "white",
    required_fields => [
        'invention_title',
        'abstract',
        'problem_solved',
        'advantages',
        'description',
        'inventors',
        'inventor_addresses',
        'inventor_citizenships',
    new_status_small => "New",
    new_status_large => "New Disclosure",
    partial_status_small => "",
    partial_status_large => "complete",
    complete_status_small => "Complete",
    complete_status_large => "Requirements Complete",
    contexts => [
        'inventor_in_progress',
        'witness_in_progress',
        'viewer_in_progress',
        'super_user',
    ],
);
```

New_status_small, partial_status_small, etc. all map to text that shows as part of the description of the status of a given document.

Context is a role in a given state. Context either inherits or overrides requirements defined by state. Context defines a set of actions available to someone who may access a given document in this context.

Each state of a document may have one or more contexts. The access and no_access list define who has access to each context. Each context defines a set of actions that are then available to anyone who has access to that context.

If a given user has access to more than one context, then that user may exercise all available actions in all accessible contexts. In such a situation, the requirements used for the document will be those defined by the first context in the list of contexts defined by the state.

Each context template includes a name and description for a given context, an access and no_access list that defines who has access to the context, a list of actions available to users who may view this document in this context, and a default action to be used when a user asks for a particular document from the system directly (via the URL, for example). In these cases, the user's context is determined and the default action specified in that context is used to present the requested document. Additionally a context template can optionally include a set of requirements. If not defined, the context inherits the requirements of the state.

Table 7 below give an example of a context template.

TABLE 7

```
%TEMPLATE = (
    class       => 'context',
    name        => "Witness",
    description => "Named Witnesses of this Invention Disclosure",
    access => [
        "FIELD|witnesses",
    ],
```

TABLE 7-continued

```
    requirements => [
        'witness_dates',
    ],
    actions => [
        'witness_disclosure_view',
        'witness_disclosure',
    ],
    default_action => 'witness_disclosure_view',
    new_status_small => "Not Witnessed",
    new_status_large => "Not Witnessed",
    partial_status_small => "",
    partial_status_large => "witnessed",
    complete_status_small => "Witnessed",
    complete_status_large => "Witnessed",
);
```

In Table 7 above, each action here points to an action template. If no access list is defined, then access to this context is unrestricted.

An action can be performed or exercised on a single document. In general, every action maps to a single button. Each action has a type defined by an ActionType system-layer template. Depending on the type of action, it may include a list of fields or action pages.

An action can be many things. For example, an action can be a view of a document's history, a multi-page edit form, a single-page printer-friendly view of a document, a transition that moves a document from one state to another, a notification message, or even a Save and Close button. In general, each action maps to a button when the engine draws pages.

Each class of document in the database has a set of actions associated with it. Access to these actions is determined mainly by state and context. If a document is in a given state, and a user has access to that document in a certain context of that state, then the set of actions defined by the context is available to the user. However, many actions link to other actions as well, so the set of actions available to a user in a given context may be more than just those listed in the context template.

Each action may also define an availability, which determines whether an action that a user has access to is available. In general, all actions define a name and description for the given action, an action_type that points to an ActionType object, and an availability (defaults to always). In addition an action may define a prompt that will query the user with an OK/Cancel box before executing the action, a button_bgcolor and/or button_textcolor to change the color of a button, an access list and a no_access list that will further restrict access to a given action, and other fields depending on the type of action. Actions inherit all fields defined in the parent ActionType object.

Table 8 below give an example of an action template with ActionType multi_page_edit.

TABLE 8

```
%TEMPLATE = (
    class       => 'action',
    name        => "Edit Disclosure",
    description => "Edit this Invention Disclosure",
    action_type => "multi_page_edit",
    button_bgcolor => "yellow",
    documentation => [
        'hints',
        'good_examples',
        'bad_examples',
        'help',
    ],
    help => [
```

TABLE 8-continued

```
<<END,
When you are ready to move on to the next question, click
<b>Next</b>.
END
    ],
    action_pages => [
        'new_disclosure_documentation',
        'create_disclosure_form_preview',
        'GROUP|General Information',
            'title',
            'abstract',
            'END_GROUP',
        'GROUP|Description of Invention',
            'problems_solved',
            'advantages',
            'description',
            'END_GROUP',
        'GROUP|Inventor Information',
            'inventors',
            'inventors_home_addresses',
            'inventors_citizenships',
            'END_GROUP',
        'submit_to_legal',
    ],
);
```

In Table 8, the action is of ActionType multi_page_edit. This action defines the Edit Disclosure set of screens that inventors use to submit a disclosure, linked together by Next/Previous. Documentation defines which documentation fields should be used to create this multi-page-edit. Each element of this list is a template of type documentation. Text to use for this documentation is collected from the document, state, context, action, action_page, and field templates that make up a given screen of HTML. The help list of text here is documentation that will appear on every page of the multi-page-edit. Action_pages lists the ActionPage templates that make up this multi-page-edit. Action pages that are grouped in the navigation bar are contained within GROUP and END_GROUP entries in the list.

Table 9 below give an example of an action template with ActionType paper_form_view.

TABLE 9

```
%TEMPLATE = (
    class       => 'action',
    name        => "View Disclosure",
    description => "View this Invention Disclosure in a printable format",
    action_type => "paper_form_view",
    header_fields => [
        'PD_number',
        'legal_received_date',
        'managing_attorney',
    ],
    fields => [
        'GROUP|General Information',
            'invention_title',
            'abstract',
            'END_GROUP',
        'GROUP|Description of Invention',
            'problem_solved',
            'advantages',
            'description',
            'END_GROUP',
        'GROUP|Inventor Information',
            'inventors',
            'inventor_addresses',
            'inventor_citizenships',
            'END_GROUP',
    ],
);
```

In Table 9, the action is of ActionType paper_form_view. Header_fields is a list of fields to use in the header of the paper_form_view. Fields is a list of field templates that are to be used to create this view of this document. Groups of fields are grouped together between GROUP and END_GROUP.

Table 10 below give an example of an action template with ActionType transition.

TABLE 10

```
%TEMPLATE = (
    class       => 'action',
    name        => "Submit to Legal",
    description => "Submit this Invention Disclosure for
processing",
    action_type  => "transition",
    availability => "on_state_requirements_complete",
    prompt       => "Are you sure you want to submit
this Invention Disclosure? ",
    button_bgcolor   => "red",
    button_textcolor => "white",
    target_state => "submitted",
    transition_page => "yes",
    transition_page_title => "Invention Disclosure Submitted!",
    transition_page_content =>
<<END,
Thank you for submitting this Invention Disclosure.
<p>
This form will now be processed and you will be contacted if any
additional information is required.
END
);
```

In Table 10 above, the action is of ActionType transition. Target_state is the change the disclosure to when the action is exercised. This action defines a transition page, which is a sort of "Thank you for performing this action" page that pops up when the button is clicked. Actions of this type may also define a list of notification actions to be exercised. After this action is complete, if the action was called from another action, then the view stack is popped until a view is available that is valid.

Table 11 below give an example of an action template with ActionType notification.

TABLE 11

```
%TEMPLATE = (
    class       => 'action',
    name        => "Inventor Feedback",
    description => "Send feedback to the inventors of this
disclosure",
    action_type => "notification",
    send_to => [
        "FIELD|inventors",
    ],
    message =>
<<END,
Title: <invention_title>
Dear <RECIPIENT>,
Thank you for submitting the Invention Disclosure referenced
above. We have reviewed your disclosure and we have determined
the
following:
Filing Decision: <filing_decision>
<feedback_to_inventors>
In case you would like to discuss this further, please contact
myself or the reviewer, <reviewer>.
Sincerely,
<patent_coordinator>
URL:
<LINK>
END
);
```

Table 11 above describes action of ActionType notification. When the message is presented and sent, fields in the content of the message will be replaced with actual values from the database.

An ActionPage is an individual page in a multi-page-edit Action. Next and Previous navigate between action pages. Each ActionPage must be of a type specified by an ActionPageType template.

There are several types of action pages, including a form preview, edit fields, documentation, and a review page. Action pages templates generally contain a name and description for the page, an action page type that specifies the ActionPageType template to use, override values for anything defined in the ActionPageType template, values dependent on the type of action page. In addition an ActionPage template may define an access list and a no_access list. Each action page template inherits values from its ActionPageType template.

Table 12 below give an example of an action page template.

TABLE 12

```
%TEMPLATE = (
    class       => 'action_page',
    name        => "Announced",
    description => "Edit invention disclosure announced, date
announced, and announced details fields",
    action_page_type => "fields",
    fields => [
        'announced',
        'announced_date'
        'announced_details'
    ],
);
```

Table 12 shows an action page with an ActionPageTemplate type of fields. Fields is a list of fields to be edited on this action page.

A field is a template that defines a specific field in the database. Type is specified by an associated FieldType template. Fields may store a single value, such as a string, multiple values, such as a people shopping cart, or multiple fields, such as a table.

Each field template contains a name and description for the given field, the name of the file in which this field is stored, a FieldType template to use with this field, override values for anything defined in the FieldType template, a prompt to use when editing this field, any desired documentation fields. The field template may define an access list and a no_access list. Each field template inherits values from its associated FieldType template.

Table 13 below give an example of a field template.

TABLE 13

```
%TEMPLATE = (
    class       => 'field',
    name        => "Inventors",
    description => "Inventors of this invention",
    field type  => people,
    prompt      => "Pursuant to my (our) employment agreement, I
(we) submit this disclosure:",
    ordered     => "yes",
    item_name   => "Inventor",
);
```

Figure 3:
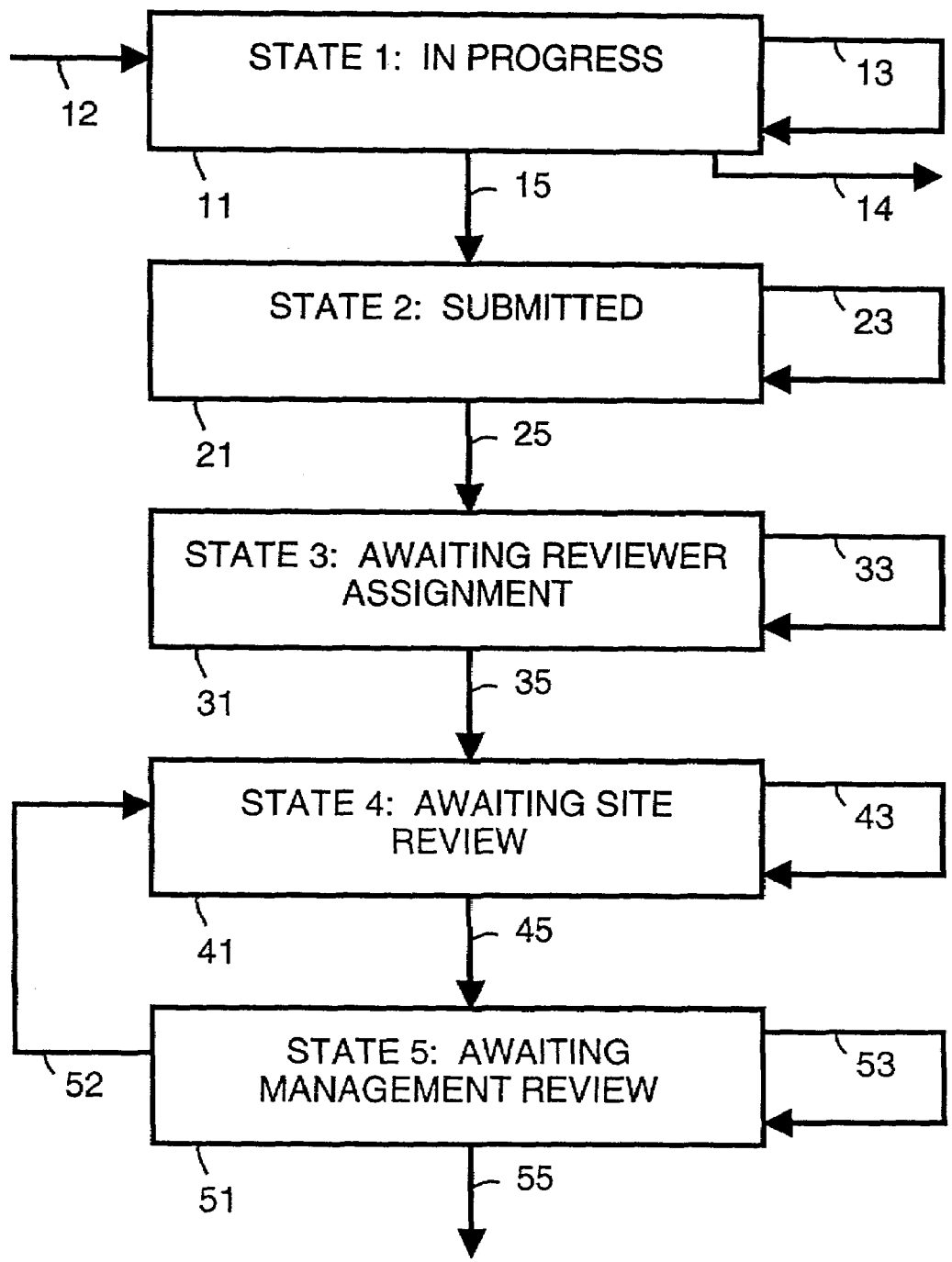
FIG. 3 is a simplified document state diagram illustrating a template implementation of a template-driven process system in accordance with a preferred embodiment of the present invention.

In Table 13 above, ordered and item_name are specific to the people field type. FIG. 3 is a simplified document state diagram illustrating a template implementation for preparation and review of an invention disclosure.

An arrow 12 represents creation of a new invention disclosure. In a first state 11, the invention disclosure is in progress. For example, an inventor is required to fill out information in several fields. The fields include, for example, the Title, Abstract, published details, prior solutions, description, and so on. Arrow 13 indicates the invention disclosure is incomplete and has been saved for later work. An arrow 14 represents an action to delete the invention disclosure. An arrow 15 indicates a submission of the invention disclosure, for example, to a legal administrator. Submission is done, for example, when all required fields have been completed. FIG. 4 shows a sample web page 61 utilized by the inventor in filling out the requested information.

In a second state 21, the invention disclosure is submitted and in the possession of a legal administrator. An arrow 23 indicates the legal administrator is holding the invention disclosure. The legal administrator is required to fill in fields such as patent docket number, managing attorney, received date and so on. An arrow 25 indicates that the invention disclosure is sent to a patent coordinator. The invention disclosure is sent to a patent coordinator, for example, when all required fields have been completed.

In a third state 31, the invention disclosure is in the possession of a patent coordinator. An arrow 33 indicates the patent coordinator is holding the invention disclosure. The patent coordinator is required to fill in fields identifying, for example, a patent coordinator, a reviewer and a site review committee. An arrow 35 indicates that the invention disclosure is sent to a reviewer. The invention disclosure is sent to a reviewer, for example, when all required fields have been completed.

In a fourth state 41, the invention disclosure is in the possession of a reviewer. An arrow 43 indicates the reviewer and/or a site review committee is holding the invention disclosure. The reviewer can fill out optional fields for, for example, reviewer comments and reviewer recommended filing decision. A site review committee is required to fill in fields. For example, the site review committee is required to fill out a filing decision field, an award decision field and a foreign filing decision field. The site review committee may also fill out optional fields such as comments pertaining to any required field and feedback to the inventor. An arrow 45 indicates that the invention disclosure is sent to management for review. The invention disclosure is sent to management, for example, when all required fields have been completed.

In a fifth state 51, the invention disclosure is in the possession of a management review committee. An arrow 53 indicates the management review committee is holding the invention disclosure. The management review committee reviews filing decisions from the site review committee and either approves the decisions or sends the decisions back to the site review committee for reconsideration. An arrow 55 indicates that the invention disclosure has been accepted for filing and has been sent on to a next state. The next state can include, for example, proceeding with filing the invention disclosure as a patent application, inactivation of the invention disclosure, further review of the invention disclosure to determine whether trade secrets are contained therein, publication of the invention disclosure or a combination of the invention disclosure with another invention disclosure. An arrow 52 indicates the management committee is returning the invention disclosure to the reviewer and site review committee for reconsideration.

Figure 5:
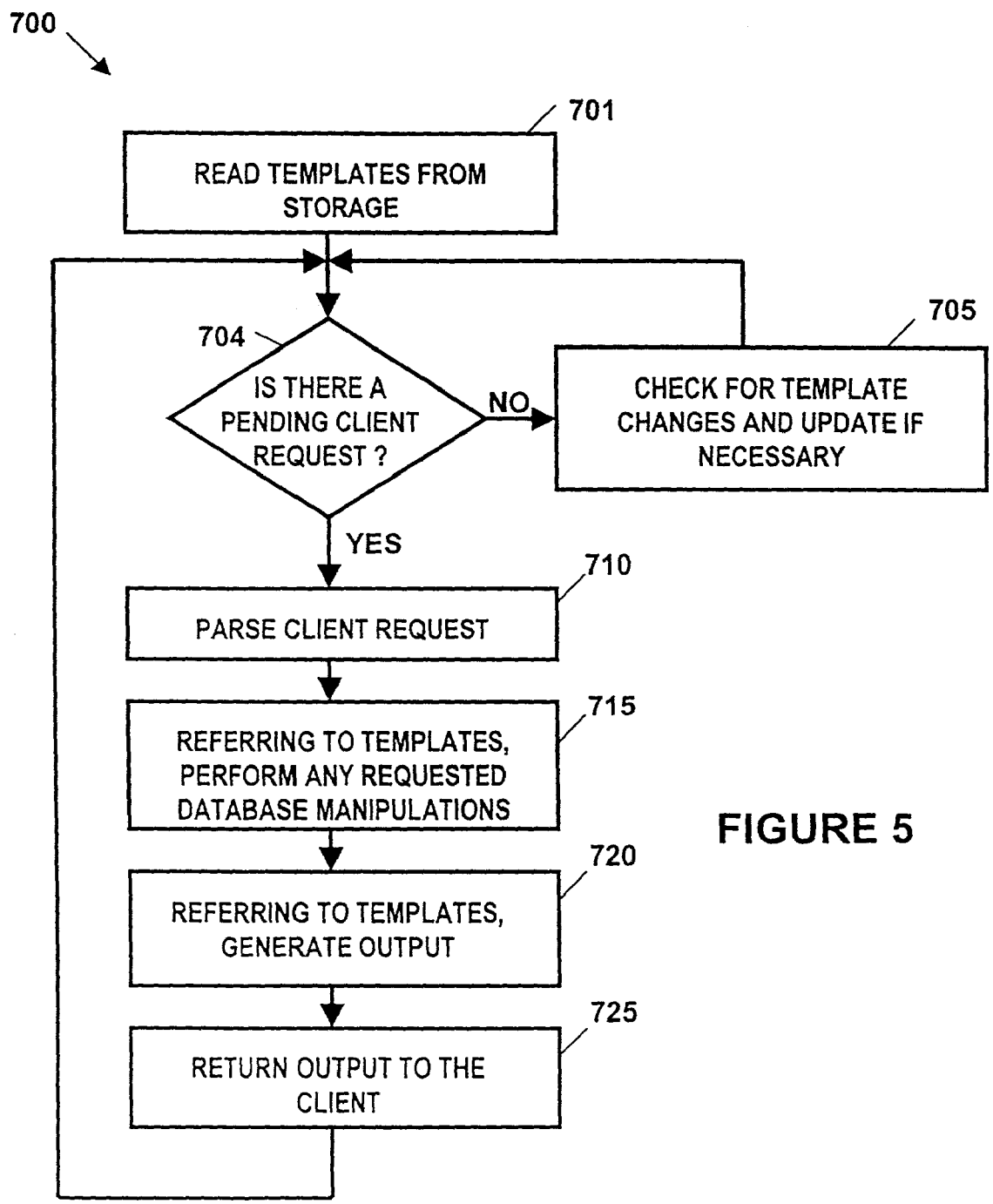
FIG. 5 shows a flowchart for a template translator in accordance with an embodiment of the invention.

FIG. 5 shows a flowchart 700 for template translator 70 in accordance with an embodiment of the invention. In one embodiment, flowchart 700 is implemented via Perl or XML, but other programming languages could be used to implement flowchart 700 and still fall within the spirit and scope of the invention. Block 701 reads one or more templates from storage or storage media. Block 704 asks if there is a pending request from a client. A request from a client might include user requests for a page defined by a page template, a view defined by a view template, or an action defined by an action template. If not, block 705 checks for any template changes, and provides updates if necessary. Templates may change if an application has been updated by a developer to add new functionality or fix bugs. Flow of control returns back to block 704 to check for pending client requests. When block 704 is answered affirmatively, block 701 parses the client request. Block 715 refers to the templates to perform any requested manipulations of the database. Database manipulations may include changes to fields in existing objects or creation of new objects. Block 720 generates the requested output, which is returned to the user in block 725. Flow of control returns back to block 704 to check for pending client requests.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A template-driven process system comprising:
   a template that contains information about an interactive web program that utilizes a plurality of web pages to create a document, the information defining for each web page in the plurality of web pages characteristics about fields for receiving data from an end user, the information also defining for the document a plurality of document states, each document state in the plurality of document states identifying at least one end user allowed to access the document and at least one action that can be performed on the document, wherein different document states identify different end users and different actions and wherein the document can only exist in one document state at a time;
   a template translator; and,
   wherein the template translator translates the template into the interactive web application; and
   wherein when the template translator has translated the template into the interactive web application, the interactive web application presents web pages to the end user, the web pages including the fields for receiving data specified by the template, wherein a current document state determines which actions are permitted to be performed on the document and which end users can take the permitted actions.

2. A template-driven process system as in claim 1, wherein the template includes a hierarchy of subtemplates.

3. A template-driven process system as in claim 1, wherein the template includes a hierarchy of subtemplates, the template and the subtemplates being different classes of template.

4. A template-driven process system as in claim 1, wherein the template is an application template that comprises a plurality of linked pages.

5. A template-driven process system as in claim 1, wherein the template is an application template that comprises a plurality of linked pages, each linked page containing elements of content.

6. A template-driven process system as in claim 1, wherein the template is an application template that comprises a home page and a plurality of linked pages.

7. A template-driven process system as in claim 1, wherein the template is an application template that comprises a home page and a plurality of linked pages, each linked page containing elements of content.

8. A template-driven process system as in claim 1 additionally comprising additional templates.

9. A template-driven process system as in claim 1, wherein the template-driven process system is used to automate a business process.

10. A method for creating a document comprising the following steps:
   (a) preparing a template that contains information defining for the document a plurality of document states, each document state in the plurality of document states identifying at least one end user allowed to access the document and at least one action that can be performed on the document, wherein different document states identify different end users and different actions;
   (b) using a template translator to translate the template into an interactive web application, wherein when the template translator has translated the template into the interactive web application, the interactive web application presents webs page to the user, the web pages including fields for receiving data; and,
   (c) allowing the user to utilize the interactive web application to submit data into the fields for receiving data, wherein a current document state determines which actions are permitted to be performed on the document and which end users can take the permitted action.

11. A method as in claim 10, wherein in step (a) the template is an application template that comprises a plurality of linked pages.

12. A method as in claim 10, wherein in step (a) the template is an application template that comprises a plurality of linked pages, each linked page containing elements of content.

13. A method as in claim 10, wherein in step (a) the template includes a hierarchy of subtemplates.

14. A method as in claim 10, wherein in step (a) the template includes a hierarchy of subtemplates, the template and the subtemplates being different classes of template.

15. A method as in claim 10, wherein in step (c) the user interfaces with the interactive web application using one of the following:
   a desktop computing system;
   a portable computer;
   a personal digital assistant;
   a cell phone with processing capability;
   a pager with processing capability;
   another type of computing system.

16. A method as in claim 10:
   wherein in step (c) the user interfaces with the interactive web application using one of the following devices:
      a desktop computing system,
      a portable computer,
      a personal digital assistant,
      a cell phone with processing capability,
      a pager with processing capability,
      another type of computing system; and,
   wherein in step (b) the template translator customizes the interactive web application for optimal interface to the device used by the user to interface with the interactive web application.

17. A method as in claim 10, wherein in step (c) the user interfaces with the interactive web application using a web browser.

18. A method as in claim 10, wherein in step (a) the template is an application template that comprises a home page and a plurality of linked pages.

19. A method as in claim 10 additionally comprising the following steps:
   (d) preparing a second template;
   (e) using the template translator to translate the second template into a second interactive web application; and,
   (f) allowing the user to utilize the second interactive web application to submit data pertaining to the second template.

20. Storage media storing software which when run on a computing system performs a method comprising the following steps:
   (a) in response to a design& entering as input a template, the template containing information that defines for the document a plurality of document states, each document state in the plurality of document states identifying at least one end user allowed to access the document and at least one action that can be performed on the document, wherein different document states identify different end users and different actions, performing the following:
      (a.1) translating the template into the interactive web application, wherein when the template is translated into the interactive web application, the interactive web application presents web pages to the end user, the web pages including the fields for receiving data, and wherein the interactive web application allows the end user to utilize the interactive web application to submit data into the fields for receiving data, wherein a current document state determines which actions are permitted to be performed on the document and which end users can take the permitted actions.

21. Storage media as in claim 20, wherein in step (a) the template is an application template that comprises a plurality of linked pages.

22. Storage media as in claim 20, wherein in step (a) the template is an application template that comprises a plurality of linked pages, each linked page containing elements of content.

23. Storage media as in claim 20, wherein in step (a) the template is an application template that comprises a home page and a plurality of linked pages.

24. Storage media as in claim 20, wherein in step (a) the template includes a hierarchy of subtemplates.

25. Storage media as in claim 20, wherein in step (a) the template includes a hierarchy of subtemplates, the template and the subtemplates being different classes of template.

26. Storage media as in claim 20, wherein the method additionally comprises the following step:
   (b) in response to the designer entering as input a second template to be used for a process, performing the following substep:
      (a.1) translating the second template into a second interactive web application, the second interactive web application allowing the end user to utilize the interactive web application to submit data pertaining to the second template.

* * * * *

UNITED STATES PATENT AND TRADEMARK OFFICE
CERTIFICATE OF CORRECTION

| | | |
|---|---|---|
| PATENT NO. | : 7,287,229 B2 | Page 1 of 1 |
| APPLICATION NO. | : 10/115395 | |
| DATED | : October 23, 2007 | |
| INVENTOR(S) | : Damien R. Forkner et al. | |

It is certified that error appears in the above-identified patent and that said Letters Patent is hereby corrected as shown below:

In column 15, line 32, in Claim 10, delete "action" and insert -- actions --, therefor.

In column 16, line 18, in Claim 20, delete "design&" and insert -- designer --, therefor.

Signed and Sealed this

Twenty-fourth Day of June, 2008

JON W. DUDAS
*Director of the United States Patent and Trademark Office*